(12) United States Patent
Teeters et al.

(10) Patent No.: US 6,586,133 B1
(45) Date of Patent: Jul. 1, 2003

(54) NANO-BATTERY SYSTEMS

(75) Inventors: Dale Teeters, Sand Springs, OK (US); S. Lane Fisher, Oklahoma City, OK (US); Nina Korzhova, Tulsa, OK (US)

(73) Assignee: The University of Tulsa, Tulsa, OK (US)

( * ) Notice: Subject to any disclaimer, the term of this patent is extended or adjusted under 35 U.S.C. 154(b) by 82 days.

(21) Appl. No.: 09/789,147

(22) Filed: Feb. 20, 2001

Related U.S. Application Data
(60) Provisional application No. 60/184,172, filed on Feb. 21, 2000, and provisional application No. 60/213,366, filed on Jun. 23, 2000.

(51) Int. Cl.$^7$ ............................ H01M 6/42; H01M 10/40
(52) U.S. Cl. ...................... 429/152; 429/303; 429/317; 429/338; 29/623.5
(58) Field of Search ................................ 429/152, 303, 429/304, 306, 316, 317, 320, 338; 29/623.5

(56) References Cited

U.S. PATENT DOCUMENTS

| | | | | |
|---|---|---|---|---|
| 6,042,959 | A | * | 3/2000 | Debe et al. .................... 429/33 |
| 6,197,450 | B1 | * | 3/2001 | Nathan et al. .......... 429/304 X |
| 6,387,560 | B1 | * | 5/2002 | Yadav et al. ............ 429/304 X |
| 2002/0009632 | A1 | * | 1/2002 | Kim et al. .................. 429/122 |

OTHER PUBLICATIONS

Park, Y.J., Park, K.S., Kim, J.G., Kim, M.K., Kim, H.G., Chung, H.T., J. Power Sources (2000) 88 (2), 250 (Month Unknown).
Park, Y.J., Kim, J.G., Kim, M.K., Kim, H.G., Chung, H.T., Park, Y., J. Power, Sources (2000) 87 (1–2), 69 (Month Unknown).
Levasseur, A., Vinatier, P., Gonbeau, D., Bull. Mater. Sci. (1999) 22 (3), 607. (May).
Han, K.S., Tsurimoto, S., Yoshimura, M., Solid State Ionics (1999) 121 (1–4), 229. (Month Unknown).
Park, Y., Kim, J.G., Kim, M.K., Chung, H.T., Um, W.S., Kim, M.H., Kim, H.G., J. Power Sources (1998) 76 (1), 41. (Month Unknown).
Lee, S.J., Lee, J.K., Kim, D.W., Baik, H.K., Lee, S.M., Journal of the Electrochemical Society (1996) 143 (11) L268–L270. (Nov.).
Jones, S.D., Akridge, J.R., Solid State Ionics (1996) 86–8 Part 2 1291–1294. (Month Unknown).
Kinoshita, K., Song, X., Kim, J., Inaba, M., Kim, J., Journal of Power Sources (1999) 82 170–175. (Month Unknown).
Binhar, H., Zuniga, B., and Teeters, D. "Lithium Polymer Battery Systems Using Poly(Chloroacetylene) Electrodes," presented at the 215th National Meeting of the American Chemical Society, Dallas, TX, Mar. 29–Apr. 2, 1998.
Nagatomo, T., Kakehata, H., Ichikawa, C., and Omoto, O., J. Electrochem. Soc., (1985) 132, 1380 (Jun.).
Nagatomo, T., Kakehata, H., Ichikawa, C., and Omoto, O., Synth. Met., (1987) 18, 649, (Month Unknown).
Korzhova, N., Fisher, S.L., LeGranvalet–Mancini, M., Teeters, D. "Ionic Conduction in Polymer Electrolyte/Microporous Membrane Composites," presented at the Symposium on Polymers for Batteries and Fuel Cells, the 217th National Meeting of the American Chemical Society, Anaheim, CA, Mar. 21–25, 1999. (Month Unknown).
Alivisatos, A. P., J. Phys. Chem. (1996) 100 13226. (Month Unknown).
Alivisatos, A. P., Science, (1996) 271 933. (Feb.).
Leppert, V. J., Mahammuni, S., Kumbhojkar, N. R., Risbud, S. H. Materi Sci. Eng. B, 1998, 52 89. (Month Unknown).

(List continued on next page.)

Primary Examiner—Stephen Kalafut
(74) Attorney, Agent, or Firm—Head, Johnson & Kachigian (57) ABSTRACT

A nano-battery or micro-battery produced by a process which includes the steps of providing a membrane with a plurality of pores, filling the membrane pores with an electrolyte, and capping the filled pores with electrodes in communication with the electrolyte to form nano-batteries or micro-batteries.

19 Claims, 5 Drawing Sheets

OTHER PUBLICATIONS

Bradley, J. S. in Cluster and Colloids from Theory to Applications, Schmid, G., Ed., VCH: Weinheim, 1994, Chapter 6 and reference therein. (Month Not Applicable).

Yonezawa, T., Toshima, N., J. Chem. Soc., Faraday Trans. (1995) 91, 4111. (Month Unknown).

Toshima, N., Harada, M., Yamazake, Y., Asakura, K., J. Phys. Chem. (1992), 96, 9927. (Month Unknown).

Esumi, K., Wakabayashi, M., Torigoe, K., Colloids Surf., (1996) 109 55. (Month Unknown).

Schaefer, D. M., Reifenberger, R., Patil, A., Samelson, L., Appl. Phys. Lett. (1995) 66 1012. (Feb.).

Junno, T., Deppert, K., Montelius, L., Samuelson, L., Appl. Phys. Lett. (1995) 6 3627. (Jun.).

Sheehan, P. Leiber, C. M., Science (1996) 272, 1158. (May).

Baur, C., Gazen, B. C., Koel, B. E., Ramachandran, T. R., Requicha, A. A. G., Zini, L., J. Vac. Sci. Tehnol., B (1997) 15, 1577. (Jul./Aug.).

Brandow, S. L., Dressick, W. J., Dulcey, C. S., Koloski, T. S., Shirey, L. M., Schmidt, J., Calvert, J. M., J. Vac. Sci. Technol., B (1997) 15, 1818. (Sep./Oct.).

Ramachandran, T. R., Baur, C. Bugacov, A., Madhukar, A., Koel, B. E., Requicha, A. A. G., Gazen, B. C., Nanotechnology, (1998) 9, 237. (Month Unknown).

Schindler, W., Hofmann, D., Kirschner, J., J. Appl. Phys. (2000) 87 7007. (May).

Cepak, V. M., Martin, C. R., Chem. Mater. (1999) 11 1363. (Month Unknown).

Anantram, M. P., Datta, S., Xue, Y., Phys. Rev. B (2000) 61 14219). (May).

* cited by examiner

NANO-BATTERY SYSTEMS

CROSS-REFERENCE OF RELATED APPLICATION

This application claims priority to U.S. Provisional Application No. 60/184,172, filed Feb. 21, 2000 entitled NANO-BATTERY SYSTEMS and U.S. Provisional Application No. 60/213,366, filed Jun. 23, 2000 entitled NANOBATTERY SYSTEMS.

BACKGROUND OF THE INVENTION

1. Field of the Invention

The present invention is directed to the field of nano-technology. In particular, the present invention is directed to nano-batteries or micro-batteries, as well as to their manufacture and use.

2. Prior Art

Nano-technology has been variously described as a shotgun marriage of chemistry and engineering and as a fabrication technology in which objects are designed and built with the individual specification and placement of each separate atom. The first unequivocal nano-fabrication experiments are said to have taken place in 1990, with the deposition of individual xenon atoms on a nickel substrate to spell the logo of a certain very large computer company. The term "nano-technology" itself was allegedly coined by K. Eric Drexler, in his book "Engines of Creation", where it was predicted that nano-technology could give rise to replicating assemblers, permitting an exponential growth of productivity and wealth.

Manufactured products are made from atoms, and their properties depend on how those atoms are arranged. Molecular manufacturing, in particular, involves the use of nano-scale mechanical systems to guide the placement of reactive molecules, thereby building complex structures with atom-by-atom control.

This degree of control is a natural goal for technology: Micro technology strives to build smaller devices; materials science strives to make more useful solids; chemistry strives to synthesize more complex molecules; manufacturing strives to make better products. Each of these fields requires precise, molecular control of complex structures to reach its natural limit, a goal that has been termed molecular nano-technology. It has become clear that this degree of control can be achieved.

As computer, medical and other devices become smaller, there is a need to produce smaller storage batteries to power these devices.

Previous work in the open literature referring to nano or micro-batteries has dealt almost exclusively with thin film work. (See, for example: Park, Y. J., Park, K. S., Kim, J. G., Kim, M. K., Kim, H. G., Chung, H. T., J. Power Sources (2000) 88 (2), 250; Park, Y. J., Kim, J. G., Kim, M. K., Kim, H. G., Chung, H. T., Park, Y., J. Power, Sources (2000) 87 (1–2), 69; Levasseur, A., Vinatier, P., Gonbeau, D., Bull. Mater. Sci. (1999) 22 (3), 607; Han, K. S., Tsurimoto, S., Yoshimura, M., Solid State Ionics (1999) 121 (1–4), 229; Park, Y., Kim, J. G., Kim, M. K., Chung, H. T., Um, W. S., Kim, M. H., Kim, H. G., J. Power Sources (1998) 76 (1), 41; Brojerdi, G., Tyuliev, G., Fargues, D., Eddrief, M., Balkanski, M., Surface and Interface Analysis, (1997) 25 (2) 111–118; Lee, S. J., Lee, J. K., Kim, D. W., Baik, H. K., Lee, S. M., Journal of the Electrochemical Society (1996) 143 (11) L268–L270; and Jones, S. D., Akridge, J. R., Solid State Ionics (1996) 86-8 Part 2 1291–1294.) In these papers, the so-called micro-batteries are systems where very thin films of electrolyte material were used to construct the battery, or the potential for these films to be used in batteries was discussed. The actual size of the batteries based on the size of the electrodes was much greater than the nanometer scale. Kinoshita, Song, Kim and Inaba (See: Kinoshita, K., Song, X., Kim, J., Inaba, M., Kim, J., Journal of Power Sources (1999) 82 170–175.) have discussed the conceptual design for a carbon-based rechargeable lithium micro-battery and the progress in fabricating the electrode micro structure. This technology is based on photoresists technology commonly used in the semiconductor industry. The work described here uses a different technology to develop a more complete nano or micro-battery system.

It is the inventors' good faith belief that there have been no disclosures/publications of any significant work of this kind performed either in the general area of "nano-battery" technology, nor specifically in the development of a device or process similar to the ones disclosed herein.

It would appear, therefore, that a process or method for manufacturing, using nano-technological techniques and principles, a micro-device which is able to solve the problem of providing power to nano-machines, does not currently exist.

It is, therefore, a principal object and purpose to provide a nano storage battery.

It is an additional object and purpose of the present invention to provide a manufacturing process to produce a nano storage battery.

SUMMARY OF THE INVENTION

The present invention provides a manufacturing process that can be implemented and a device created whereby nano-battery or micro-battery systems can be built, charged and even tested as set forth and described herein.

The present invention involves the fabrication of nano-battery systems that have electrode dimensions of less than 200 nanometers or micro-battery systems that have electrode systems greater than 200 nanometers up to 100 micrometers.

These battery systems may be made by using porous membrane technology. Membranes already exist that have pores from one (1) micron (1000 nm) to less than 100 nm in diameter. Existing known membranes are today used for filtration purposes.

These membranes have pores that have been successfully filled with polymer electrolyte materials either by extrusion of the molten polymer through the membrane or by using capillary forces to "pull" the liquid, molten polymer through the pores. (See, for example: N. Korzhova, S. L. Fisher, M. Lee Granvalet-Mancini, and D. Teeters, "Ionic Conduction in Polymer Electrolyte/Microporous Membrane Composites," Proceedings of the American Chemical Society Division of Polymeric Materials: Science and Engineering, 217th meeting of the ACS, Mar. 21–25, 1999, Anaheim, Calif. (American Chemical Society, Washington, D.C. 1999), p. 618.)

The next step in the fabrication is the placement of electrodes on the electrolyte-filled pores. Experiments in the Applicants' laboratory and work done by other researchers (See, for example: Nagatomo, T., Kakehata, H., Ichikawa, C., and Omoto, O., J. Electrochem. Soc., (1985) 132 1380; and Nagatomo, T., Kakehata, H., Ichikawa, C., and Omoto, O., Synth. Met., (1987) 18, 649, Kinoshita, K., Song, X., Kim, J., Inaba, M., Kim, J., Journal of Power Sources (1999) 82 170–175.) have shown that an electrically conducting polymer—such as polyacetylene—can be used as an electrode for battery application. The Applicants have developed a liquid suspension of polyacetylene particles having a particle size that will just cover the membrane pores without passing through the pores, thus capable of making the electrodes for the nano-battery systems.

The positioning of the polyacetylene particles over the openings may be monitored by using atomic force microscopy ("AFM") or scanning electron microscopy ("SEM").

The present invention also involves charging of nano-batteries or micro-batteries and monitoring their voltage. The charging of the system may be accomplished using a current-sensing AFM, where an electrically-conducting cantilever tip will be touched to the electrode; a current will be applied; and the system will be charged. The AFM tip touching the electrode will then be used to monitor the voltage output of the system and other electrochemical characteristics, and tests can be conducted such as cyclic voltametery, a.c. impedance spectroscopy and battery charge/discharge cycling.

The present invention involves numerous embodiments. In one embodiment, a solid polymeric electrolyte is incorporated into a nano-molecular or micro-molecular membrane pore. The pore is preferentially lined with a non-conductive polymer. The pore is then capped with an electrode. In such cases the membrane can be selectively removed with the lining from the filled pore (or visa-versa), and a solid particulate nano-battery or micro-battery is formed. Such an isolated nano or micro-battery may be then in placed appropriately on the desired site such as, e.g., a micro-machine.

In a second embodiment, a porous membrane has its pre-sized pores at least partially filled with a solid or liquid electrolyte. This electrolyte-filled or partially filled pore is then capped with an electrode. The emplaced micro-battery or nano-battery may be charged and serve as an energy source or depot on the membrane surface. Micro-machines moving about the membrane surface, may contact the depot and receive its stored energy. Likewise, the micro-machine or other energy recipient could be emplaced and the membrane containing the charged micro or nano-batteries moved such that the emplaced energy recipient could contact the energy stored in the pore-filling micro or nano-battery.

In another embodiment, a pore having a diameter measured in nanometers or micrometers, may be emplaced on a micro-machine or other such small device requiring energy. The emplaced pore could be at least partially filled with an electrolyte and capped with an electrode. This nano-battery or micro-battery, emplaced upon the prospective energy recipient may be charged as described elsewhere herein and used by the machine or device appropriately as an energy source.

Yet other embodiments of the invention, upon an understanding of the accompanying descriptions may be envisioned by those of skill in the art.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Structure of the Membranes

Figures 1, 2:
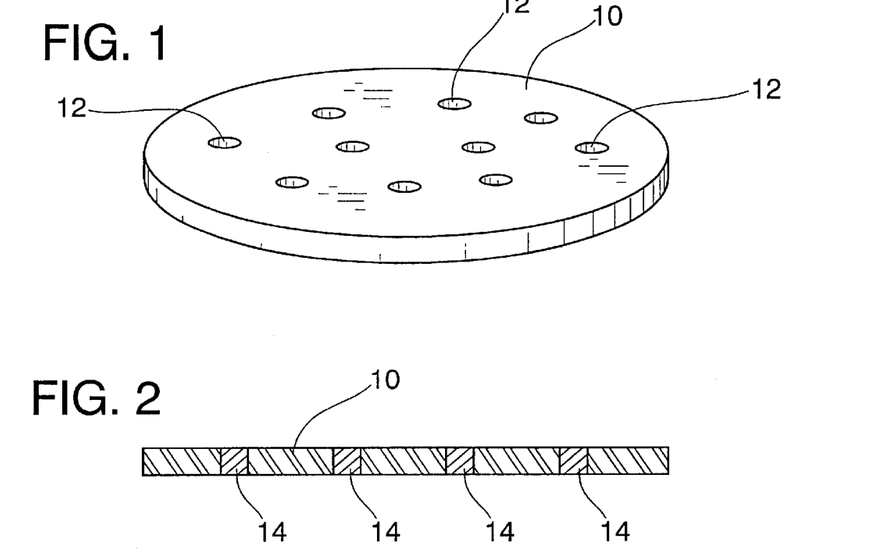
FIG. 1 illustrates a perspective view of a sample membrane that may be utilized in the processes according to the present invention.
FIG. 2 illustrates the membrane shown in FIG. 1 with electrolyte filled pores.

Referring to the drawings in detail, FIG. 1 illustrates a sample membrane 10 that may be utilized. In one example, the membrane has a plurality of pores 12 that range between ten micrometers to one nanometer (nm) in diameter. A liquid electrolyte material could be used, or a solid material that can be melted could be heated to change it to its liquid form. Either by an extrusion of a polymer or a similar electrolyte, or in the alternative, by the capillary forces of a polymer or liquid electrolyte, the electrolyte material is placed within the pores or holes of the membrane 10.

Another method of placing the electrolyte in the pores of the membrane would be to use a solution containing the dissolved electrolyte. The membranes could be placed in this solution, and then the solution placed within the pores of the membrane. With evaporation of the solvent, the electrolyte would be left in the pores.

Electrolyte Material

Materials that can be used as electrolytes are those capable of disassociating salts into their respective ions so that sufficient ion conduction is established for movement of ions between the electrodes. The following is a list of example materials that could be used for electrolyte materials. These are both liquid and solids:

Aqueous (water) solutions containing appropriate ionic salts

Poly(ethylene oxide) containing appropriate ionic salts

Poly(propylene oxide) containing appropriate ionic salts

Polyethylene glycols containing appropriate ionic salts

Polypropylene glycols containing appropriate ionic salts

Propylene carbonate containing appropriate ionic salt

Ethylene carbonate containing appropriate ionic salt

Comb-branched systems comprised of low molecular weight polyether chains grafted to polymer backbone. These must contain an appropriate ionic salt.

Gel electrolyte materials—These consist of polymer hosts such as polystyrene, poly(vinyl chloride), poly(vinyl alcohol), polyacrylonitrile, poly(vinylidene fluoride), and poly(ethylene oxide), which have had materials like propylene carbonate, ethylene carbonate, dioctyl sebacate, or diethyl phthalate added as plasticizers. These materials must contain an appropriate ionic salt.

FIG. 2 illustrates a cross section of a membrane 10 having pores that have been filled with electrolyte 14.

Electrode Material

An electrode material can be placed over the electrolyte-filled pores so that the electrodes form a cap. These electrode particles could be (1) particles of electrically-conducting polymers, such as polyacetylene, or (2) nanoparticles of electrode materials, such as vanadium pentoxide, $V_2O_5$, titanium dioxide $TiO_2$, or similar compounds. Particles that are of nanoscale dimensions are manufactured and can many times be purchased or can be prepared by standard techniques described in the literature. (See, for example: Alivisatos, A. P., J. Phys. Chem. (1996) 100 13226; Alivisatos, A. P., Science, (1996) 271–933; Leppert, V. J., Mahammuni, S., Kumbhojkar, N. R., Risbud, S. H. Materi Sci. Eng. B, 1998, 52–89; Bradley, J. S. in Cluster and Colloids from Theory to Applications, Schmid, G., Ed., VCH: Weinheim, 1994, Chapter 6 and references therein; Yonezawa, T., Toshima, N., J. Chem. Soc., Faraday Trans. (1995) 91, 4111; Toshima, N., Harada, M., Yamazake, Y., Asakura, K., J. Phys. Chem. (1992), 96 9927; Esumi, K., Wakabayashi, M., Torigoe, K., Colloids Surf., (1996) 109 55.). The following are compounds and materials that could be used for electrode materials, especially for lithium ion based battery systems. These materials or the corresponding alkali or alkaline metal ion materials could be used for battery systems based on the alkali or alkaline metals. The general class of these compounds is given above each group.

Inorganic Oxide Compounds $MoO_3$, $Cr_3O_8$, $V_2O_5$, $V_6O_{13}$, $LiV_3O_8$, $MnO_2$, $LiCoO_2$, $LiNiO_2$, $LiMn_2O_4$, $LiVO_2$, $LiCrO_2$, $WO_3$, $TiO_2$.

Inorganic Chalcogenides $TiS_2$, $MoS_2$, $NiPS_3$, $TiSe_3$, $TiTe_2$, $MoS_2$, $MoSe_2$, InSe.

Carbon and Fluorocarbon Compounds

Coke, Graphite, $CF_n$, $(C_2F)_n$, $C_7CoCl_2$.

Polymeric Materials poly(acetylene), poly(pyrrole), poly(vinylferrocene), poly(aniline), poly(p-phenylene), poly(phenylene sulfide).

Figure 3:
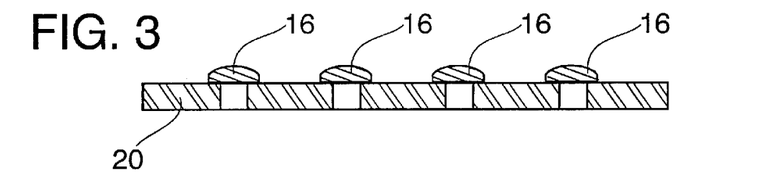
FIG. 3 illustrates a porous membrane with pores capped by a nanoelectrode.
Figure 8:
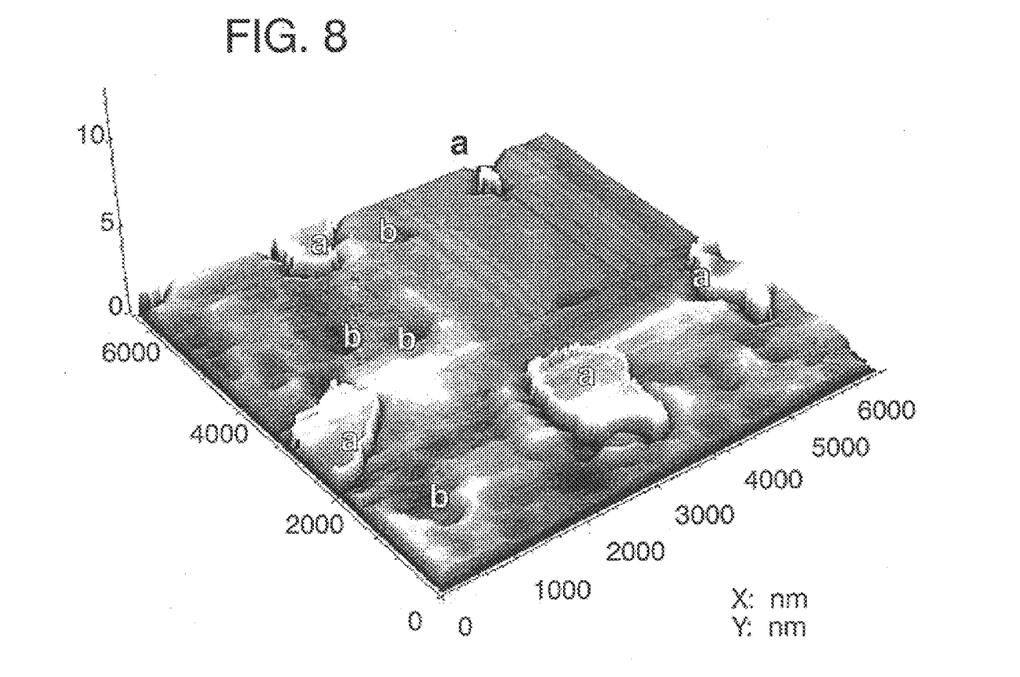
FIG. 8 shows an AFM image of a porous membrane with particulate polyacetylene pore caps.

In another preferred procedure illustrated in FIG. 3, these electrode particles 16 could initially be placed over the pores by pouring a suspension of the particles on the membrane 20, thus allowing the solvent to enter and exit the pores, while the particles cannot go through the pores and are trapped over the pores in the correct position for the electrode arrangement. The suspension could be various liquids. Demonstrating this process, the Applicants have successfully trapped particles of the electrolyte material polyacetylene over 300 nanometer diameter holes in a polycarbonate membrane 20 by using this method. An AFM image of this surface is shown in FIG. 8 which also demonstrates the ability to view and work with these nanoscopic particles. Thereafter, electrolyte 22 may be filled in the pores by capillary action resulting in a membrane shown in FIG. 4.

Figure 4:
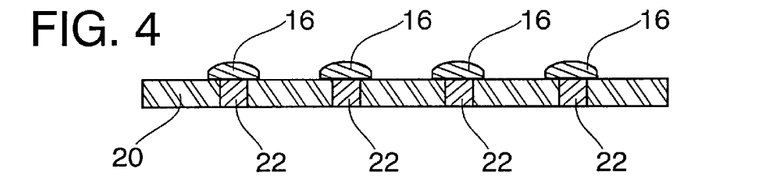
FIG. 4 illustrates membrane pores filled with an electrolyte and capped by an nanoelectrode.

In an alternative procedure, the electrode particles are extruded along with the room-temperature liquid or molten electrolyte. This electrolyte fills the membrane pores and then the particles are trapped by the pores, once again covering them in the appropriate electrode configuration. The particles can also be moved into place with the aid of an atomic force microscope (AFM) or other nano positioning devices. Recent work described in the literature has shown that is possible to very precisely manipulate or move nanoparticles on a surface by using the tip of the atomic force microscope. (See Schaefer, D. M., Reifenberger, R., Patil, A., Samelson, L., Appl. Phys. Lett. (1995) 66 1012; Junno, T., Deppert, K., Montelius, L., Samuelson, L., Appl. Phys. Lett. (1995) 6 3627; Sheehan, P. Leiber, C. M., Science (1996) 272, 1158; Baur, C., Gazen, B. C., Koel, B. E., Ramachandran, T. R., Requicha, A. A. G., Zini, L., J. Vac. Sci. Technol., B (1997) 15, 1577; Brandow, S. L., Dressick, W. J., Dulcey, C. S., Koloski, T. S., Shirey, L. M., Schmidt, J., Calvert, J. M., J. Vac. Sci. Technol., B (1997) 15, 1818; Ramachandran, T. R., Baur, C. Bugacov, A., Madhukar, A., Koel, B. E., Requicha, A. A. G., Gazen, B. C., Nanotechnology, (1998) 9, 237.) The particles could be pushed or moved to the desired position above a pore to form the electrode. Alternatively, the particles could also be placed in the correct position by placing a charge on the electrolyte filled pores along the surface of the membrane so that the particles are attracted to the charged areas (pores) and serve to cap them. The resulting membrane would be as shown in FIG. 4.

Figure 5:
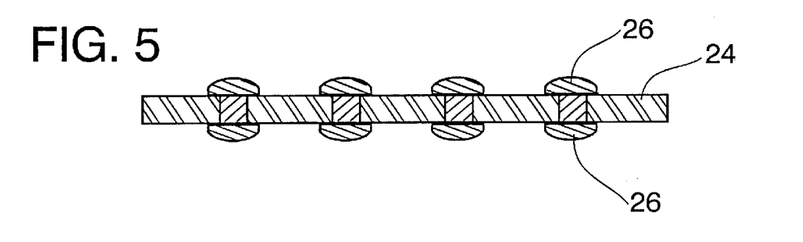
FIG. 5 illustrates membrane pores capped at both ends by nanoelectrodes.
Figure 6:
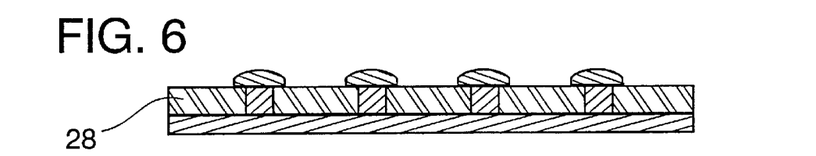
FIG. 6 illustrates electrolyte filled porous membranes capped with nanoparticles at the upper side serving as nano or microelectrodes and the counter electrode completely covers the opposite side of the membrane.

The other side of the membrane—that side without the covered membrane pores—could have its pores covered either in a similar manner, seen in the example of a membrane 24 and electrodes 26 in FIG. 5, or the bottom side could be continuous and could serve in and of itself as an electrode as shown with the membrane 28 in FIG. 6.

The Component Membranes

Various membrane materials could be used—either polymeric (such as polycarbonate) or ceramic materials (such as $Al_2O_3$). It is only necessary that the membrane have pores that can be created by laser ablation, a chemical etching process, electrochemical processes or by other methods. Varying the thickness of the membranes is another advantage of this process. Thicker membranes, which would mean longer pores, would increase the energy density of the nano-battery system. If power density was of more importance, thinner membranes, i.e. shorter pores, would be more desirable. Changes in energy density or current density could also be tailored by changing the pore diameters. The pores might have diameters from 1 nm to 10 $\mu$m with length of the pores from less than 1 $\mu$m to about 100 $\mu$m. If the membrane thickness is kept constant, increasing the pore diameter would increase the power density. Such membranes of varying pore diameters and thicknesses can currently be purchased commercially or made by electrochemical processes. However, there may be certain advantages to performing the process specifically for this application, as nano-batteries or micro-batteries could be placed in all types of materials and substrates, rather than limiting use to those that are commercially available. Pores of varying sizes in substrates of varying thickness would allow the nano-battery to be designed for a specific application. The pores could be made in the substrates of computer chips, micro-electromechanical systems such as micro-actuators, micro-instruments or micro-robots to make components that have their own integrated power supplies.

Charging and Testing Nano-batteries

Both charging and testing of nano-batteries or micro-batteries could be achieved by using a known atomic force microscope, or AFM.

Figure 7:
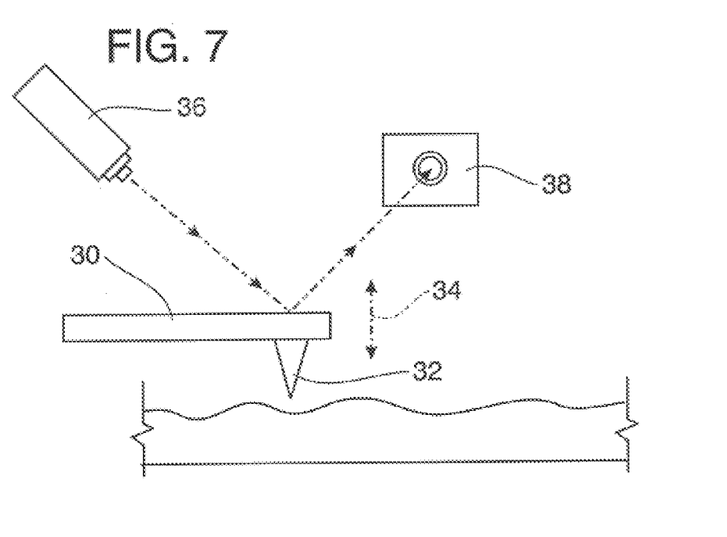
FIG. 7 schematically illustrates an atomic force microscope (AFM) along with a laser light beam that is used in the AFM to monitor the sample surface.

The AFM is an instrument that is able to image the surface of materials at the atomic level. As seen in FIG. 7, the AFM consists of a flexible cantilever 30 that is usually made of silicon nitride or silicon. This tip is flexible enough that even tiny force acting on the tip will cause it to bend. A tiny tip 32 is located at the end of the cantilever. The end of this tip can have a radius of curvature of 20 nanometers or less. This tip is brought in contact with any flat surface, and is rastered across the surface. The cantilever is so flexible that it will easily move up and down as the tip traces the conformation of atoms or other structure as the tip is rastered across the surface as illustrated by arrow 34.

The motion of the tip is monitored by bouncing a laser beam 36 off the back of the cantilever. The reflection of the beam is captured by a photodetector 38 off the back of the cantilever. The photodetector measures changes in intensity owing to interference between the incoming and reflected light beam (a method called interferometry). The change in intensity is used to generate an image of the surface.

FIG. 8 illustrates how these nano-batteries can be observed. FIG. 8 is an atomic force microscopy image of a polycarbonate filtration membrane with pores (labeled with "b") ranging from approximately 200 nm to 500 nm. Polyacetylene particles (labeled with "a") ranging in size from 1 micron (1000 nm) to 200 nm have been placed over the pores by pouring a suspension of the particles on the membrane, thus allowing the liquid in the suspension to enter and exit the pores. The particles could not pass or go through the pores and are trapped over the pores in the correct position for an electrode arrangement. The total size of the original image is approximately 6 microns by 6 microns (6000 nm by 6000 nm).

Previous work done by Schindler, Hofmann and Kirschner (See, for example: Schindler, W., Hofmann, D., Kirschner, J., J. Appl. Phys. (2000) 87 7007.) has shown that the tip of a scanning tunnel microscope, an instrument very similar to an atomic force microscope, can be used to conduct electrochemical reactions. Thus, the AFM can also be used to charge the nano-batteries. If the cantilever and the tip are electrically conducting, the tip can be placed on the nano-electrode, a voltage applied, and thus, the battery becomes charged. In a similar manner, an external circuit could be used to test the battery as well. Tests such as cyclic voltammetry, a.c. impedance tests, and battery cycling test could be conducted to determine the performance of the battery.

Figure 10:
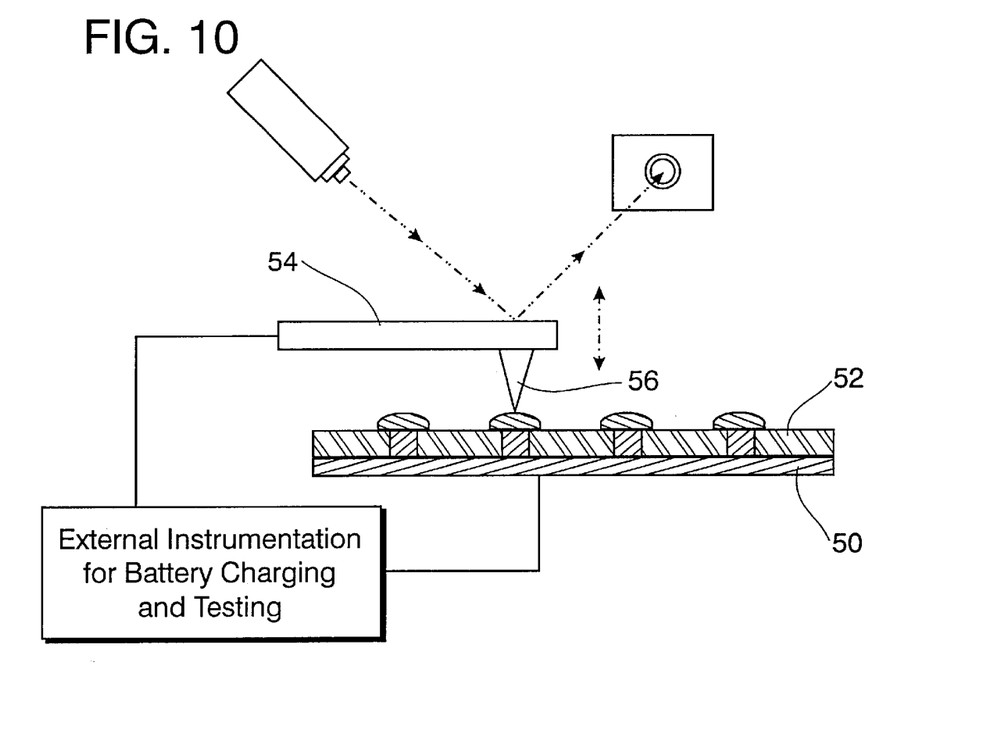
FIG. 10 schematically shows how an AFM is used to charge or test nano-batteries or micro-batteries.

FIG. 10 is a schematic diagram of how an AFM can be used to charge nano-batteries. In this diagram, the bottom electrode 50 covers the entire membrane 52. An electrical connection is made with the bottom electrode and the cantilever 54 of the AFM. If the cantilever and the tip 56 are electrically conducting, the tip can be placed on the nano-electrode, a voltage can then be applied by an external source, and thus, the battery becomes charged. In a similar manner, an external circuit could be used to test the battery as well. Tests such as cyclic voltammetry, a.c. impedance tests and battery cycling tests could be conducted to determine the performance of the battery.

Alternatively, contacts to the batteries could be made by the use of nanowire systems (see Anantram, M. P., Datta, S., Xue, Y., Phys. Rev. B (2000) 61 14219). The nanowires would lead to the charging or testing devices or to nanomachines using the power from the nanobattery for operation.

Alternate Related Processes and Embodiments

Figure 9:
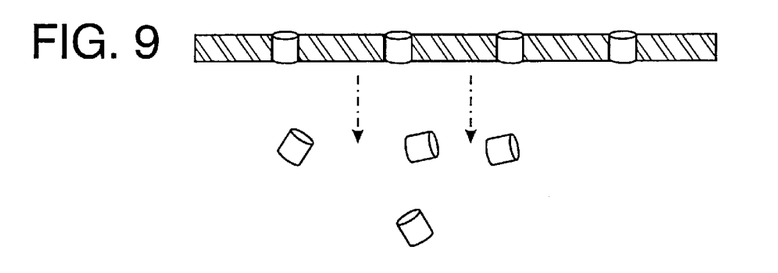
FIG. 9 schematically illustrates removal of nano-battery or micro-battery components from a membrane after formation of the batteries.

The inside of pores in alumina membranes have in the past been covered with polymer "sleeves" or tubes. (See, for example: Cepak, V. M., Martin, C. R., Chem. Mater. (1999) 11 1363). As an alternate method of producing batteries by the present invention, the alumina membrane can be dissolved by using acids, which leave polymer tubes as a remainder. One could fill the tubes while they are still in the membrane with an electrolyte as herein described, and then seal the pores with electrode particles. As best seen in FIG. 9, the alumina membrane can be dissolved, leaving freestanding tubular nano-batteries.

EXAMPLES

The present invention may be used to produce batteries having voltages from 1 volt to several volts with microamp to pico-amp ranges. For instance, a test in the Applicants' laboratory on a macroscopic battery (electrode surface area of approximately 1 $cm^2$) having polyacetylene for both electrodes (cathode and anode) and a poly(ethylene oxide)/salt electrolyte resulted in a voltage of approximately 1 volt with the current in the microamp range.

As an additional example, a nano-battery on a scale less than 200 nanometers, was recently produced and tested in Applicants' laboratory. An $Al_2O_3$ filtration membrane with pores or holes of 20 nanometers was utilized. The electrolyte was a polyethylene glycol wax containing the lithium salt $LiSO_3CF_3$. The electrolyte was melted and the molten material was "pulled" into the pores by capillary action. One electrode, the cathode, covered the entire side of the $Al_2O_3$ membrane so that a battery systems as shown in FIG. 6 could be made. The cathode was a composite electrode made from $V_2O_5$, carbon black, and a binding polymer. Micro and nano (5 microns to less than one micron) sized particles of graphite were used to form the other electrode, the anode. These particles were "sprinkled" on the surface of the $Al_2O_3$ membrane having pores filled with electrolyte. Particles that fell on the pores in the proper arrangement made nanobatteries. This made the type of battery system shown in FIG. 6 that had an electrode arrangement similar to that shown in FIG. 8.

As shown schematically in FIG. 10, a current conducting AFM tip was placed in contact with a graphite particle which served as the electrode. The batteries were charged by applying 10 volts charge for 10 minutes. The circuit containing the charging device was then disconnected. Once the nanobattery was charged, a voltage or current measuring device was connected to the nanobattery to measure the charge on the battery.

Figure 11:
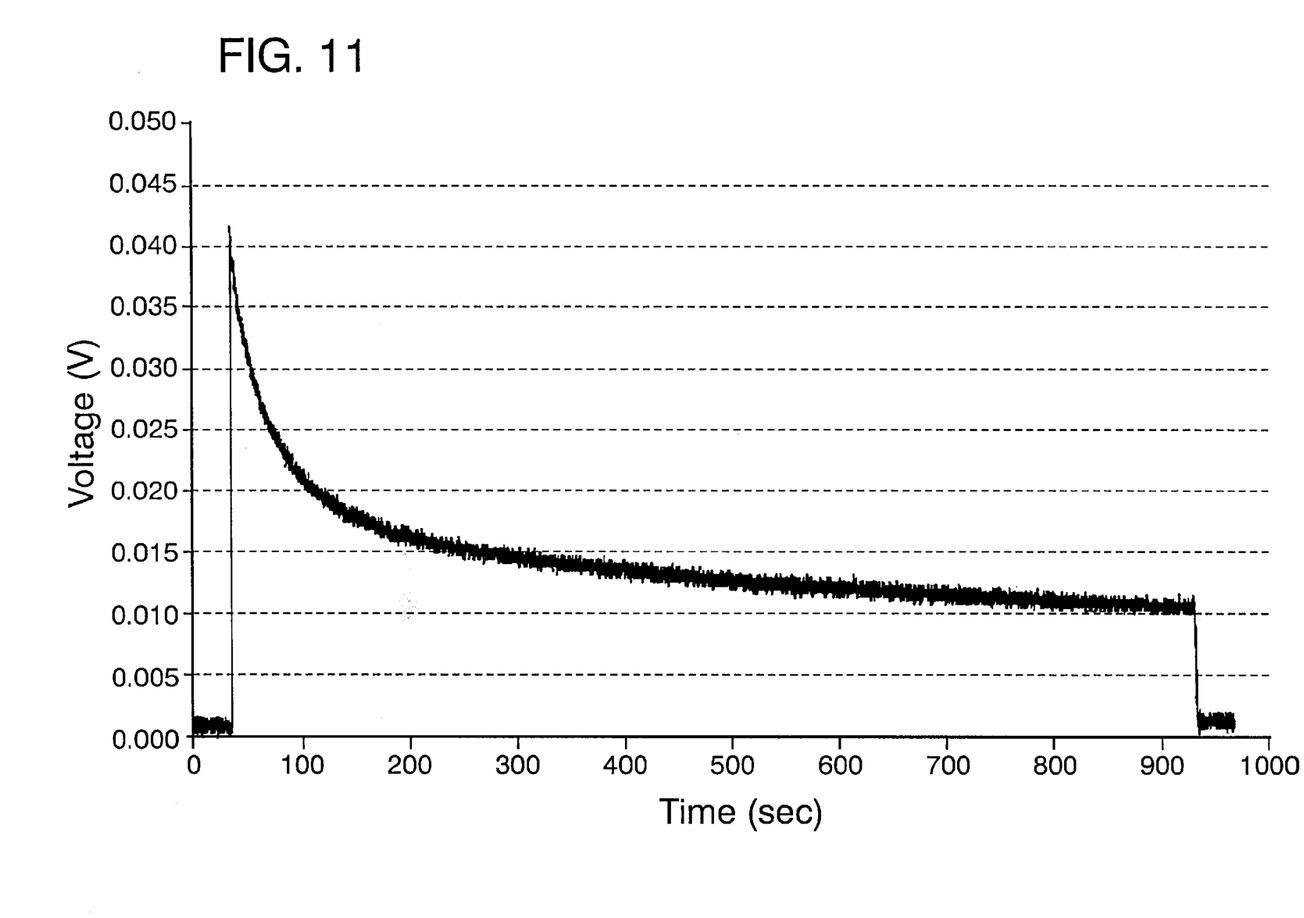
FIGS. 11 and 12 are charts illustrating the discharge characteristics of nano-batteries created in accordance with the present invention.
Figure 12:
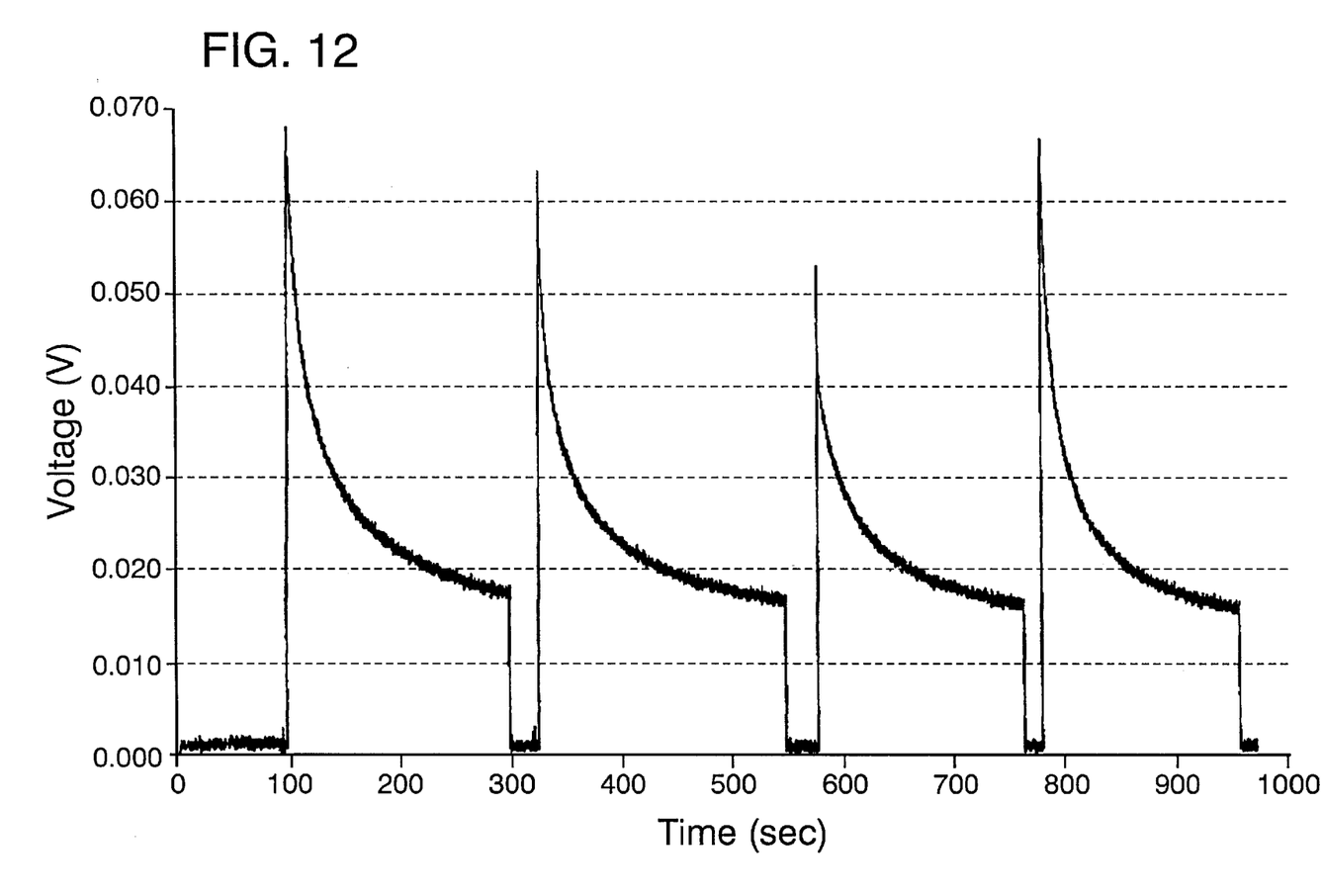

FIGS. 11 and 12 are charts illustrating the discharge characteristics of nano-batteries created in accordance with the present invention. The X axis illustrates time in seconds while the Y axis illustrates voltage. The internal resistance of the AFM was used as an electrical load and the discharge was observed.

FIG. 11 shows one discharge cycle. At approximately the 30 second point on the X axis, the nanobattery was connected to a voltage measuring device. At this time the battery started discharging due to the internal resistance of the AFM. At approximately 930 seconds the circuit was broken and the voltage drops to zero. Such a discharge cycle is typical of a battery system. FIG. 12 shows cycles where another nanobattery was charged and then discharged and then charged and discharged again. Four such cycles were done. Once again, these charge/discharge cycles are typical of a functioning battery system.

Batteries produced in accordance with the present invention may be used for a wide variety of purposes, including as a battery for miniature computer chips with "on chip" power supplies, power supplies on micro-electro mechanical systems (MEMS), for miniaturized electronic medical devices, such as miniature hearing aids or artificial "ears", or other applications in nanomachines and nanotechnology.

Whereas, the present invention has been described in relation to the drawings attached hereto, it should be understood that other and further modifications, apart from those shown or suggested herein, may be made within the spirit and scope of this invention.

The following are incorporated by reference herein for the reasons cited above.

REFERENCES

1. Park, Y. J., Park, K. S., Kim, J. G., Kim, M. K., Kim, H. G., Chung, H. T., J. Power Sources (2000) 88 (2), 250.
2. Park, Y. J., Kim, J. G., Kim, M. K., Kim, H. G., Chung, H. T., Park, Y., J. Power, Sources (2000) 87 (1–2), 69.
3. Levasseur, A., Vinatier, P., Gonbeau, D., Bull. Mater. Sci. (1999) 22 (3), 607.
4. Han, K. S., Tsurimoto, S., Yoshimura, M., Solid State Ionics (1999) 121 (1–4), 229.
5. Park, Y., Kim, J. G., Kim, M. K., Chung, H. T., Um, W. S., Kim, M. H., Kim, H. G., J. Power Sources (1998) 76 (1), 41.
6. Brojerdi, G., Tyuliev, G., Fargues, D., Eddrief, M., Balkanski, M., Surface and Interface Analysis, (1997) 25 (2) 111–118.
7. Lee, S. J., Lee, J. K., Kim, D. W., Baik, H. K., Lee, S. M., Journal of the Electrochemical Society (1996) 143 (11) L268–L270.
8. Jones, S. D., Akridge, J. R., Solid State Ionics (1996) 86-8 Part 2 1291–1294.
9. Kinoshita, K., Song, X., Kim, J., Inaba, M., Kim, J., Journal of Power Sources (1999) 82 170–175.
10. Binhar, H., Zuniga, B., and Teeters, D. "Lithium Polymer Battery Systems Using Poly(Chloroacetylene) Electrodes," presented at the 215th National Meeting of the American Chemical Society, Dallas, Tex., Mar. 29–Apr. 2, 1998.
11. Nagatomo, T., Kakehata, H., Ichikawa, C., and Omoto, O., J. Electrochem. Soc., (1985) 132 1380.
12. Nagatomo, T., Kakehata, H., Ichikawa, C., and Omoto, O., Synth. Met., (1987) 18, 649.
13. Korzhova, N., Fisher, S. L., LeGranvalet-Mancini, M., Teeters, D. "Ionic Conduction in Polymer Electrolyte/ Microporous Membrane Composites," presented at the Symposium on Polymers for Batteries and Fuel Cells, the 217th National Meeting of the American Chemical Society, Anaheim, Calif., Mar. 21–25, 1999.
14. Alivisatos, A. P., J. Phys. Chem. (1996) 100 13226.
15. Alivisatos, A. P., Science, (1996) 271 933.
16. Leppert, V. J., Mahammuni, S., Kumbhojkar, N. R., Risbud, S. H. Materi Sci. Eng. B, 1998, 52 89.
17. Bradley, J. S. in Cluster and Colloids from Theory to Applications, Schmid, G., Ed., VCH: Weinheim, 1994, Chapter 6 and references therein.
18. Yonezawa, T., Toshima, N., J. Chem. Soc., Faraday Trans. (1995) 91, 4111.
19. Toshima, N., Harada, M., Yamazake, Y., Asakura, K., J. Phys. Chem. (1992), 96 9927.
20. Esumi, K., Wakabayashi, M., Torigoe, K., Colloids Surf., (1996) 109 55.
21. Schaefer, D. M., Reifenberger, R., Patil, A., Samelson, L., Appl. Phys. Lett. (1995) 66 1012.
22. Junno, T., Deppert, K., Montelius, L., Samuelson, L., Appl. Phys. Lett. (1995) 6 3627.
23. Sheehan, P. Leiber, C. M., Science (1996) 272, 1158.
24. Baur, C., Gazen, B. C., Koel, B. E., Ramachandran, T. R., Requicha, A. A. G., Zini, L., J. Vac. Sci. Technol., B (1997) 15, 1577.
25. Brandow, S. L., Dressick, W. J., Dulcey, C. S., Koloski, T. S., Shirey, L. M., Schmidt, J., Calvert, J. M., J. Vac. Sci. Technol., B (1997) 15, 1818.
26. Ramachandran, T. R., Baur, C. Bugacov, A., Madhukar, A., Koel, B. E., Requicha, A. A. G., Gazen, B. C., Nanotechnology, (1998) 9, 237.
27. Schindler, W., Hofmann, D., Kirschner, J., J. Appl. Phys. (2000) 87 7007.
28. Cepak, V. M., Martin, C. R., Chem. Mater. (1999) 11 1363.
29. Anantram, M. P., Datta, S., Xue, Y., Phys. Rev. B (2000) 61 14219).

What is claimed is:

1. A nano-battery or micro-battery produced by a process comprising:

providing a membrane with a plurality of pores having diameters of from about 1 nm to about 10 $\mu$m;

filling said membrane pores with an electrolyte; and capping each filled pore with an electrode from about 1 nm to about 10 $\mu$m in diameter in communication with said electrolyte to form individual nano-batteries or micro-batteries.

2. The nano-battery of claim 1 wherein the process includes the additional step of charging said batteries using voltages delivered from an atomic force microscope.

3. The nano-battery of claim 1 wherein the process includes an additional step of creating said pores in said membrane by laser ablation or chemical etching.

4. The nano-battery of claim 1 where the membrane is at least one of:

polymeric or ceramic materials.

5. The nano-battery of claim 1 where the electrodes are at least one of:

inorganic Oxide Compounds chosen from the group consisting of $MoO_3$, $Cr_3O_8$, $V_2O_5$, $V_6O_{13}$, $LiV_3O_8$, $MnO_2$, $LiCoO_2$, $LiNiO_2$, $LiMn_2O_4$, $LiVO_2$, $LiCrO_2$, $WO_3$, and $TiO_2$;

inorganic chalcogenides chosen from the group consisting of $TiS_2$, $MoS_2$, $NiPS_3$, $TiSe_3$, $TiTe_2$, $MoS_2$, $MoSe_2$, and InSe;

carbon or Fluorocarbon compounds chosen from the group consisting of Coke, Graphite, $CF_n$, $(C_2F)_n$, and $C_7CoCl_2$; and polymeric materials chosen from the group consisting of poly(acetylene), poly(pyrrole), poly(vinylferrocene), poly(aniline), poly(p-phenylene), and poly(phenylene sulfide).

6. The battery of claim 1 where the electrolyte is an ionic salt in at least one of:

an aqueous solution, poly(ethylene oxide), poly (propylene oxide), polyethylene glycols, polypropylene glycols, propylene carbonate, ethylene carbonate, comb-branched systems comprised of low molecular weight polyether chains grafted to polymer backbone, gel electrolyte materials including polymer hosts which have had propylene carbonate, ethylene carbonate, dioctyl sebacate, or diethyl phthalate added as plasticizers.

7. The battery of claim 1 where the electrolyte comprises at least one of a polymer, polymer composite, polymer gel, or liquid.

8. The battery of claim 7 where the polymer is at least one of:

poly(ethylene oxide), poly(propylene oxide), polyethylene glycols, polypropylene glycols, propylene carbonate, ethylene carbonate, comb-branched systems comprised of low molecular weight polyether chains grafted to polymer backbone, gel electrolyte materials including polymer hosts such as polystyrene, poly(vinyl chloride), poly(vinyl alcohol), polyacrylonitrile, poly(vinylidene fluoride), and poly(ethylene oxide), which have had materials like propylene carbonate, ethylene carbonate, dioctyl sebacate, diethyl phthalate added as plasticizers.

9. A nano-battery or micro-battery comprising:

a polymeric electrolyte and an electrode, the battery having a diameter of from about 1 nm to about 10 µm and a length of from about 1 µm to about 100 µm.

10. The nano-battery or micro-battery of claim 9 where the polymeric electrolyte is at least one of:

an aqueous solution, poly(ethylene oxide), poly(propylene oxide), polyethylene glycol, polypropylene glycol, propylene carbonate, ethylene carbonate, a comb-branched system comprising low molecular weight polyether chains grafted to a polymer backbone, a gel electrolyte material including polymer hosts.

11. The nano-battery or micro-battery as set forth in claim 10 wherein the gel electrolyte material has had propylene carbonate, ethylene carbonate, dioctyl sebacate, or diethyl phthalate added as a plasticizers.

12. The nano-battery or micro-battery of claim 9 where the electrode is at least one of:

inorganic oxide compounds chosen from the group consisting of $MoO_3$, $Cr_3O_8$, $V_2O_5$, $V_6O_{13}$, $LiV_3O_8$, $MnO_2$, $LiCoO_2$, $LiNiO_2$, $LiMn_2O_4$, $LiVO_2$, $LiCrO_2$, $WO_3$, and $TiO_2$, inorganic chalcogenides chosen from the group consisting of $TiS_2$, $MoS_2$, $NiPS_3$, $TiSe_3$, $TiTe_2$, $MoS_2$, $MoSe_2$, and InSe;

carbon or fluorocarbon compounds chosen from the group consisting of coke, graphite, $CF_n$, $(C_2F)_n$, and $C_7CoCl_2$; and polymeric materials chosen from the group consisting of poly(acetylene), poly(pyrrole), poly(vinylferrocene), poly(aniline), poly(p-phenylene), and poly(phenylene sulfide).

13. A process for producing a nano-battery or micro-battery system, which process comprises:

filling membrane pores with an electrolyte;

capping the filled pores with electrodes in communication with said electrolyte to form nano-batteries or micro-batteries; and charging said batteries by connecting an electrically conducting tip of an atomic force microscope to said electrode and applying voltage.

14. A process as set forth in claim 13 including the additional step of using said atomic force microscope to monitor discharge of voltage from said batteries.

15. A process as set forth in claim 13 including the additional step of testing said batteries through said atomic force microscope.

16. A nano-battery or micro-battery produced by a process comprising:

providing a membrane with a plurality of pores;

lining each pore with a non-conductive polymer;

filling said membrane pores with an electrolyte;

capping the filled pores with electrodes in communication with said electrolyte to form nano-batteries or micro-batteries.

17. A nano-battery or micro-battery produced by a process comprising:

providing a membrane with a plurality of pores having diameters of from about 1 nm to 10 µm;

filling said membrane pores with an electrolyte;

capping the filled pores with electrodes in communication with said electrolyte to form individual nano-batteries or micro-batteries; and separating the batteries from the membrane.

18. A nano-battery or micro-battery produced by a process comprising:

providing a membrane with a plurality of pores;

filling said membrane pores with an electrolyte;

capping the filled pores with electrodes in communication with said electrolyte to form nano-batteries or micro-batteries; and covering one side of the membrane with conductive material.

19. A nano-battery or micro-battery produced by a process comprising:

providing a membrane of polymeric or ceramic materials with a plurality of pores;

filling said membrane pores with electrodes in communication with said electrolyte to form nano-batteries or micro-batteries; and dissolving the membrane.

* * * * *